(12) United States Patent
Rajan et al.

(10) Patent No.: US 7,964,264 B1
(45) Date of Patent: Jun. 21, 2011

(54) ADHESION-ENHANCING SURFACES FOR MARKING MATERIALS

(75) Inventors: Sundar J. Rajan, Woodbury, MN (US); Roberta E. Harelstad, Woodbury, MN (US); Joey L. Reule, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1387 days.

(21) Appl. No.: 09/937,587

(22) PCT Filed: Mar. 30, 1999

(86) PCT No.: PCT/US99/06918
§ 371 (c)(1),
(2), (4) Date: Sep. 27, 2001

(87) PCT Pub. No.: WO00/58930
PCT Pub. Date: Oct. 5, 2000

(51) Int. Cl.
*B32B 5/16* (2006.01)
(52) U.S. Cl. ........................................ 428/141
(58) Field of Classification Search .................. 428/141, 428/142, 143, 144, 147, 195
See application file for complete search history.

(56) References Cited

U.S. PATENT DOCUMENTS

| | | | | |
|---|---|---|---|---|
| 5,153,618 A | * | 10/1992 | Frank et al. | 347/125 |
| 5,508,105 A | * | 4/1996 | Orensteen et al. | 428/323 |
| 5,585,194 A | | 12/1996 | Norman | |
| 5,670,096 A | * | 9/1997 | Lu | 264/1.1 |
| 5,842,722 A | | 12/1998 | Carlson | |

FOREIGN PATENT DOCUMENTS

| | | |
|---|---|---|
| EP | 0 529 691 | 3/1993 |
| GB | 1413158 | 11/1975 |
| RU | 94012467 | 4/1994 |
| WO | WO 96/03285 | 2/1996 |
| WO | WO 96/24867 | 8/1996 |
| WO | WO 99/11683 | 3/1999 |
| WO | WO 00/58930 | 10/2000 |

* cited by examiner

*Primary Examiner* — Alicia Chevalier
(74) *Attorney, Agent, or Firm* — Sandra K. Nowak (57) ABSTRACT

The present invention provides signage articles and methods of making, wherein the signage articles have adhesion-enhancing surfaces for marking materials. The signage articles include a substrate that includes a noncellulosic organic polymeric surface, preferably, a radiation cured coating disposed on the noncellulosic organic polymeric surface and a marking material disposed thereon. Preferably, the marking material is not substantially removed from the signage article upon wiping the marking material with gasoline for five cycles.

18 Claims, 3 Drawing Sheets

ADHESION-ENHANCING SURFACES FOR MARKING MATERIALS

CROSS REFERENCE TO RELATED APPLICATIONS

This application claims priority to International Application No. PCT/US99/06918, filed 30 Mar. 1999, which was published under PCT Article 21(2) in English.

BACKGROUND OF THE INVENTION

Polymeric sheetings have been used to produce signage articles that have retroreflective capabilities. An article possesses a retroreflective capability when it can return a substantial portion of incident light in the direction from which the light originated. Retroreflectivity renders enhanced conspicuity to the article in low or restricted lighting situations, or in situations where sheeting materials must be viewed from a distance.

Polymeric sheetings also have been used to produce signage articles that have good durability. Durability of a signage article may be important in situations where the article may be exposed to harsh vapors, ultraviolet light, temperature or humidity extremes, and the like. Abrasion resistance and resistance to cleaning agents and the solvents used in cleaning solutions also are, in some cases, important aspects of durability. If extended useful life is not an important consideration (such as labels for rapid turnover packaging), lower cost non-extended life sheetings may be used.

Polymeric sheetings also have been used to form signage articles having indicia such as alphanumeric characters, bar codes, or graphics. Frequently, the signage articles will carry information that is repeated or incrementally varied over a large number of items; for instance, license plate validation stickers may have state or county identifying information repeated on a large number of validation stickers.

For many years, validation stickers have been applied to motor vehicles to indicate that applicable taxes have been paid and/or required registrations and inspections have been completed. In a common application, small stickers (typically on the order of about 2.5 by 3.8 centimeters or so (1 by 1.5 inches) and sometimes colloquially referred to as "tabs") are applied to a designated location on the vehicle's license plate(s) to indicate that annual licensing taxes and registration fees have been paid. Other illustrative examples include application of stickers as proof of satisfactory vehicle safety inspections, satisfactory vehicle emission control inspections, and insurance coverage.

Products such as validation stickers are currently made by printing information on top of retroreflective sheeting using printing techniques such as letter press, offset press, screen printing, etc., that are typically not suitable for printing small quantities, for example. These types of printing processes normally provide satisfactory print quality, legibility, and adhesion; however, the equipment for these processes can be relatively expensive. In addition, when using letter press and offset press printing, print plates or rubber blankets must be prepared, and when using screen printing, a screen, must be prepared. The preparation of the plates, blankets, or screens, can be a costly, time-consuming process. Furthermore, in many cases, a solvent-borne colorant is used, which requires disposing of the solvent in an environmentally sound manner. Known processes also may necessitate the use of drying ovens and may require a certain amount of drying time. Further, the known means of printing indicia on articles are limited by the ease (or lack thereof) with which the information on individual items can be varied.

As laser printers, which use electrophotography, become less expensive, they are being used for printing on-demand and in small quantities. It would be desirable for validation stickers, and other signage articles that use polymeric sheeting, to be printed in small quantities and on-demand, for example. Unfortunately, however, conventional combinations of base polymeric sheeting and marking materials, e.g., those used in letter press and screen printing, are not generally sufficiently compatible to provide the desired adhesion, transparency, and durability under extremes in temperature, abrasive conditions, and exposure to chemicals (e.g., gasoline). Thus, the marking materials, e.g., toners, do not always adhere well to the base sheeting and the images formed by these marking materials are easily removed. This is a particular problem for validation stickers since they can be easily contacted by harsh chemicals, such as gasoline.

There are a variety of methods used to enhance adhesion of marking materials to sheeting material. For example, materials such as polyvinyl chloride, crosslinked polyurethane, and a composition that includes polyethylene terephthalate and a vinylidine/acrylonitrile copolymer have been used as the topmost layer of retroreflective sheeting to promote adhesion of marking materials coated thereon. Also, a halogen-free acrylic urethane topmost layer has been primed with a diluted solution of an acrylate polymer or adhesive, or corona treated to promote adhesion of marking materials. Clear coats of aliphatic or aromatic polyurethanes and acrylic polymers over the indicia have also been used to protect the underlying material, as have extruded thermoplastic cover films of aliphatic urethanes, copolymers of ethylene or propylene, and homopolymers of ethylene or propylene. Many of these, however, do not provide the necessary durability needed for many applications, particularly validation stickers that are easily contacted by harsh chemicals, such as gasoline.

SUMMARY OF THE INVENTION

The present invention provides signage articles and methods of making, wherein the signage articles have adhesion-enhancing surfaces for marking materials. The signage articles include a substrate that includes a noncellulosic organic polymeric surface, preferably, a radiation cured coating disposed on the noncellulosic organic polymeric surface and a marking material disposed thereon (which form indicia such as numbers, letters, etc.).

The present invention provides a signage article including: a substrate comprising a noncellulosic organic polymeric surface; a radiation cured coating (preferably, e-beam cured or UV-cured, and more preferably, UV-cured) disposed on the noncellulosic organic polymeric surface; and a marking material disposed on the radiation cured coating; wherein the marking material is not substantially removed from the signage article upon wiping the marking material with gasoline for five cycles (preferably, 10 cycles, and more preferably, 25 cycles). Preferably, the substrate is retroreflective sheeting, which is preferably part of a validation sticker.

The marking material preferably includes a colorant and a binder and the binder comprises a polymer selected from the group of a polyester, a vinyl, a polyolefin, a polyvinyl acetal, an alkyl or aryl substituted acrylate or methacrylate, a copolymer of ethylene or propylene with acrylic acid, methacrylic acid, or vinyl acetate, and combinations thereof. Preferably, the radiation cured coating is prepared from UV-curable composition that includes an acrylate, preferably, an aliphatic acrylated urethane.

In preferred embodiments, the marking material is not substantially removed upon abrading the marking material for 1000 scrub cycles, or upon applying a pressure sensitive adhesive-coated tape to the marking material under thumb pressure and removing it. Also, in preferred embodiments, the radiation cured coating is not substantially removed upon applying a pressure sensitive adhesive-coated tape to the radiation cured coating under thumb pressure and removing it.

In preferred embodiments, the radiation cured coating, which can be pattern coated or continuously coated, is not substantially removed upon wiping the radiation cured coating with gasoline for five cycles, or upon abrading the radiation cured coating for 1000 scrub cycles.

In certain preferred embodiments, the signage articles do not include a protective coating over the marking material.

The present invention also provides a signage article that includes: a retroreflective sheeting comprising an organic polymeric surface; a radiation cured coating comprising an acrylate disposed on the organic polymeric surface; and a marking material disposed on the radiation cured coating; wherein the marking material is not substantially removed from the signage article upon wiping the marking material with gasoline for five cycles.

In another embodiment, the signage article comprising: a retroreflective sheeting comprising an organic polymeric surface; a radiation cured coating comprising an aliphatic acrylated urethane disposed on the organic polymeric surface; and a marking material disposed on the radiation cured coating.

The present invention also provides a method of making a signage article that includes: providing a substrate comprising a noncellulosic organic polymeric surface (preferably, retroreflective sheeting) and a radiation cured coating (preferably, derived from a UV-curable composition) disposed thereon; and applying a marking material to the radiation cured coating using a technique selected from the group of electrostatic printing, ion deposition printing, magnetographic printing, inkjet printing, letter press printing, offset (i.e., offset press) printing, and gravure printing. Preferably, in this method, the marking material is not substantially removed upon wiping the marking material with gasoline for five cycles. Furthermore, preferably, the signage article does not include a protective coating over the marking material.

In another embodiment of the present invention, there is provided a method of making a signage article that includes: providing a substrate comprising a noncellulosic organic polymeric surface (preferably, this surface is formed from a radiation cured coating, and more preferably, the substrate is retroreflective sheeting); and applying a marking material to the noncellulosic organic polymeric surface using a technique selected from the group of electrophotographic printing and gravure printing; wherein the marking material is not substantially removed upon wiping the marking material with gasoline for five cycles. Preferably, the signage article does not include a protective coating over the marking material.

In yet another embodiment, there is provided a method of making a signage article that includes: providing a substrate comprising a noncellulosic organic polymeric surface (preferably, this surface is formed from a radiation cured coating, and more preferably, the substrate is retroreflective sheeting); and applying a marking material to the noncellulosic organic polymeric surface using a technique selected from the group of letter press printing and offset press printing; wherein the marking material is not substantially removed upon wiping the marking material with gasoline for five cycles; and further wherein the signage article does not include a protective cover layer.

In still another embodiment, there is provided a method of making a validation sticker, the method includes: providing a validation sticker comprising a noncellulosic organic polymeric surface; and screen printing a marking material onto the noncellulosic organic polymeric surface; wherein the marking material is not substantially removed upon wiping the marking material with gasoline for five cycles; and further wherein the validation sticker does not include a protective cover layer.

Also provided is a method of making a signage article that includes: providing a substrate comprising a noncellulosic organic polymeric surface having a radiation cured coating thereon; and screen printing a marking material onto the radiation cured coating; wherein the marking material is not substantially removed upon wiping the marking material with gasoline for five cycles; and further wherein the signage article does not include a protective cover layer.

Still another method of making a signage article includes: providing a substrate comprising a noncellulosic organic polymeric surface having a radiation cured coating thereon; and applying a marking material onto the radiation cured coating using thermal mass transfer printing; wherein the marking material is not substantially removed upon wiping the marking material with gasoline for five cycles.

BRIEF DESCRIPTION OF THE FIGURES

The invention will be further explained with reference to the drawings, wherein.

DETAILED DESCRIPTION OF PREFERRED EMBODIMENTS

The following description focuses on validation stickers for example only. Other signage articles, such as indoor/outdoor labeling products, product authentication articles, inventory labeling and control articles, window stickers and inspection stickers for automobiles and other equipment, parking permits, expiration stickers, parking signs, speed limit signs, street name signs, license plates, as well as other general traffic signs and road marking signs are also within the scope of the methods and articles of the present invention.

Figure 1:
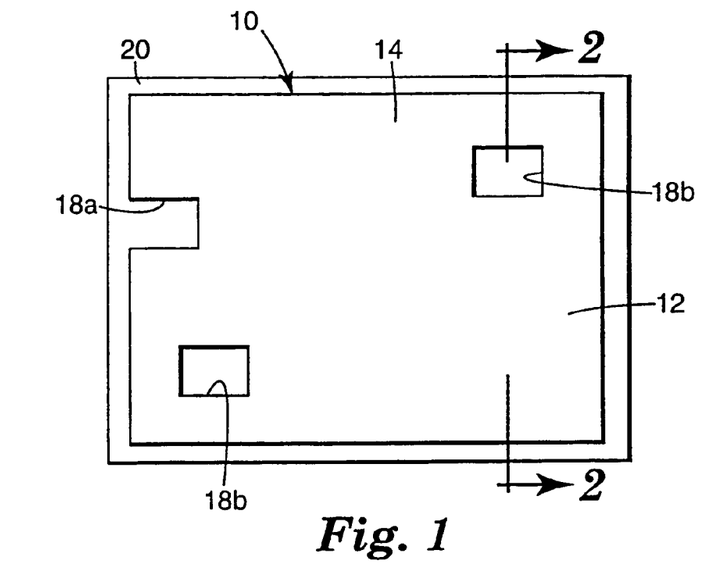
FIG. 1 is a plan view of the front of one embodiment of a validation sticker of the invention.
Figure 2:
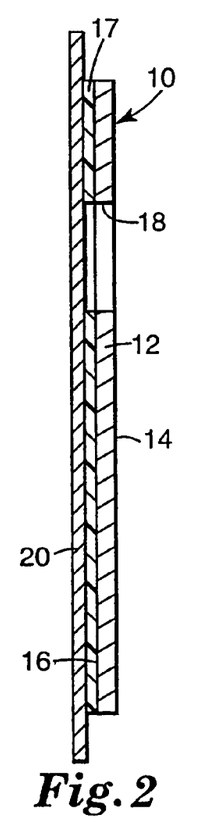
FIG. 2 is a cross-sectional view of the sticker of FIG. 1 on a temporary carrier.

An illustrative validation sticker 10 used in the invention is shown in FIGS. 1 and 2. Validation sticker 10 comprises sheet 12 having first major surface 14 and second major surface 16. In the embodiment shown, second surface 16 has adhesive layer 17 disposed thereon. Sheet 12 has one or more security openings 18a, 18b, which provide tear and shredding sites for the stickers, thereby making them "frangible." In many instances, sticker 10 will be on a removable protective liner (i.e., a temporary carrier) 20 prior to use. Liner 20, to which sticker 10 is releasably bonded, can be used to facilitate fabrication and handling of the sticker. If desired, a carrier (not shown) releasably bonded to first major surface 14 may also be used alone or in combination with a carrier on second major surface 16.

First major surface 14 is adapted for presentation of readable information (i.e., indicia) resulting from the application of marking materials (e.g., toners or inks). In many embodiments, information will be readable to the unaided eye and may be in the form of selected alphanumeric characters or other symbols, e.g., bar codes, emblems, etc., in desired colors. If desired, the information may be readable by other means, e.g., machine readable infrared images. A variety of suitable means for forming desired images on major surface 14 will be readily apparent to those with ordinary skill in the art. To enhance the visibility and/or legibility of the sticker, surface 14 is preferably retroreflective, at least in part.

Typically, surface 14 comprises an organic noncellulosic polymeric surface to which marking material (not shown) can be directly applied. Preferably, the organic polymeric surface includes a radiation cured material, although other materials are also possible that provide an adhesion-enhancing surface. Alternatively, prior to the marking material being applied to sheet 12, the organic polymeric surface can be coated with a coating to form a distinct receptive print layer (not shown) with an adhesion-enhancing surface. Such a receptive print layer can be coated in a variety of thicknesses, such as about 0.1 mil to about 1.5 mils (about 2.5 micrometers to about 38 micrometers (microns)). As a receptive print layer, it can function at lower thicknesses, and as the thickness is increased the outdoor weatherability of the polymeric surface as well as the materials below (such as the retroreflective sheeting) could be improved. Significantly, the coating, which is preferably, a radiation cured coating, provides a very receptive surface for marking materials such that combinations of materials can be chosen that provide desirable properties. Suitable materials for making the receptive print layer are described below.

Second major surface 16 is adapted for bonding sticker 10 to a substrate (not shown). In some embodiments as shown in FIG. 2, surface 16 may be coated with a layer of adhesive 17. Selection of suitable adhesives will be dependent in part upon the characteristics of the other portions of sticker 10, the characteristics of the substrate to which sticker 10 is to be applied, the conditions and manner under which the sticker is to be applied, and the conditions to which the substrate with applied sticker are to be subjected during use. Illustrative examples of adhesives useful for some embodiments of the invention include pressure-sensitive adhesives, hot melt adhesives, activated adhesives (e.g., via actinic radiation or chemical initiators), etc. Suitable adhesives for specific embodiments will be readily selected by those with ordinary skill in the art.

In other embodiments, sticker 10 is bonded to the substrate with an adhesive that is first applied to the surface of the substrate. In such instances, surface 16 may be inherently suitable for use with the intended adhesive or may be treated with suitable priming treatments such as corona or plasma exposure or application of priming coatings to improve its suitability for use with the intended adhesive. Selection of suitable treatments and adhesives will be readily made by those with ordinary skill in the art. Preferably, for a frangible signage article, such as a validation sticker, an adhesive is used that provides a peel strength to a substrate which exceeds the bond strength between the various layers of the articles. In this way, the article can be rendered frangible (for example, becomes fractured or distorted) when an attempt is made to remove the article from the substrate. Typically, the adhesive is a pressure sensitive adhesive (PSA) such as a conventional PSA that includes isooctylacrylate and acrylic acid.

Figure 3:
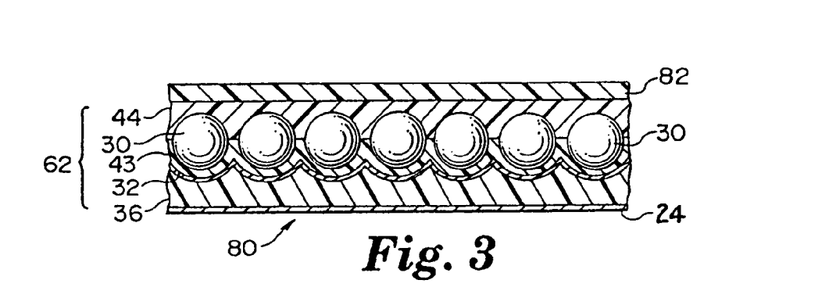
FIG. 3 is a schematic cross-sectional view of a retroreflective sheeting material having a receptive print layer thereon in accordance with the present invention.

FIG. 3 illustrates a preferred embodiment of a retroreflective polymeric sheeting 80 of the present invention. Sheeting 80 includes a removable protective liner 24 at the bottommost side, a core sheet that includes a representative beaded retroreflective element 62 and a receptive print layer 82. Retroreflective element 62 includes pressure sensitive adhesive 36, a monolayer of microspheres 30 with underlying reflective material 32, space coat layer 43, and binder layer 44.

Sheeting 80 with receptive print layer 82 is directly receptive to marking materials that include a colorant and a binder (i.e., a resin-based colorant/binder). Furthermore, the receptive print layer 82 contributes to other functional properties of polymeric sheetings of the invention. In retroreflective sheeting material 80, layer 82 may serve as a cover layer/clear coat. Layer 82 may also complete optical relationships necessary to provide retroreflectivity.

The core sheet of sheeting 80 includes retroreflective element 62 and removable protective liner 24. However, a core sheet may include only element 62, for example, when sheeting 80 is adhered to a substrate. A liner such as liner 24 may optionally be a part of a core sheet in other embodiments disclosed herein as well.

Figure 4:
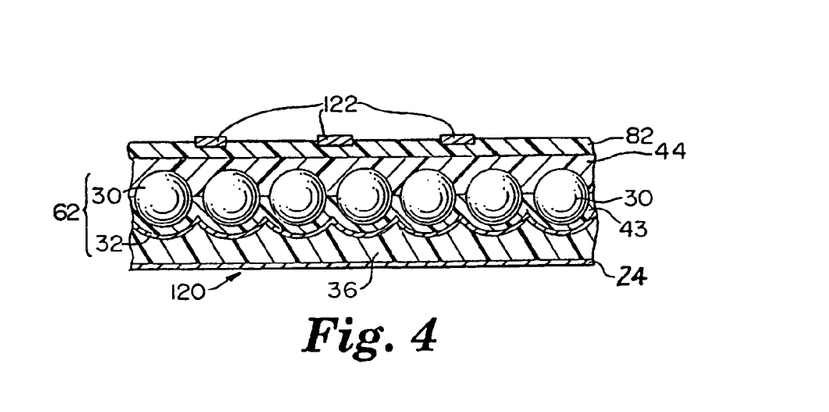
FIG. 4 is a cross-sectional view of a signage article in accordance with the present invention.
Figures 5, 6:
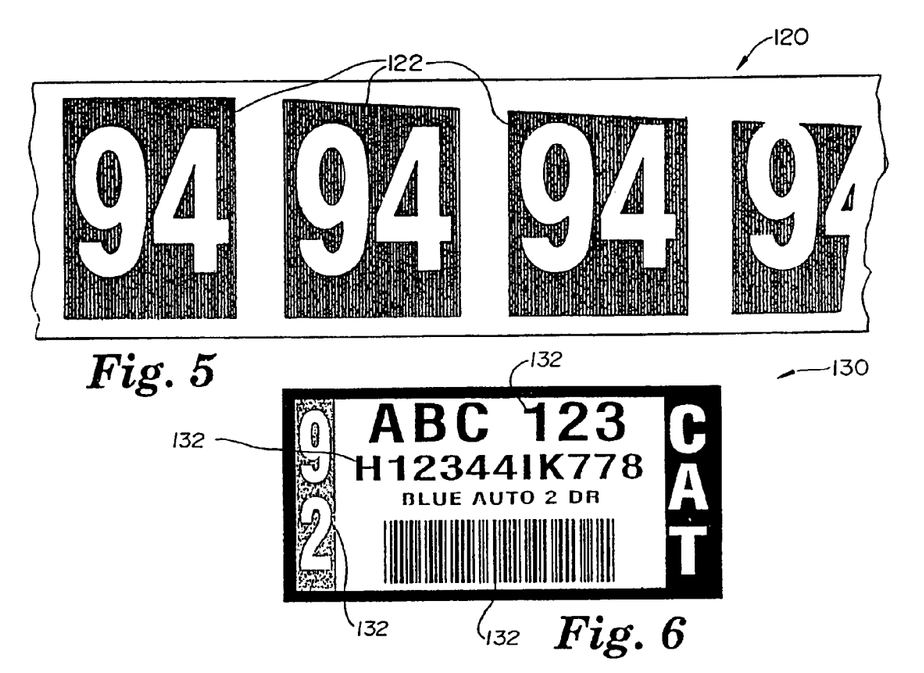
FIG. 5 is a top view of a signage article in accordance with the present invention.
FIG. 6 is a top view of a validation sticker in accordance with the present invention.

An embodiment of a signage article having indicia thereon is shown schematically in cross-section in FIG. 4, and in a top view in FIG. 5. Signage article 120 includes indicia 122 and a core sheet that includes a retroreflective polymeric sheeting material 62 as described above. Indicia 122 may be formed from a resin-based colorant/binder, and receptive print layer 82 may be formed from, for example, a composition comprising a radiation curable resin. The receptive print layer may be pattern coated or form a continuous layer. It may also include a colorant if desired.

Another embodiment of a signage article is shown in top view in FIG. 6. Article 130, which is in the form of a validation sticker, includes indicia 132 and a polymeric retroreflective sheeting material similar to sheeting 80 shown in FIG. 3. A resin-based colorant/binder can form indicia 132.

The articles of the present invention can include a cover layer for enhanced durability if desired. Such cover layers would be disposed on top of the indicia. A cover layer is not necessary in preferred embodiments because in accordance with the invention the marking materials that form the indicia and the composition that forms the adhesion-enhancing surface are chosen for sufficient durability such that the indicia need not be buried in the signage article. If desired the cover layer can be an adhesive layer.

Retroreflective polymeric sheeting in the preferred articles of the present invention may be, for example, "beaded sheeting" in the form of an encapsulated-lens sheeting (see, for example, U.S. Pat. Nos. 3,190,178; 4,025,159; 4,896,943; 5,064,272; and 5,066,098), enclosed-lens sheeting (see, for example, U.S. Pat. No. 2,407,680), or may comprise a cube corner retroreflective sheeting (see, for example, U.S. Pat. Nos. 3,684,348; 4,801,193; 4,895,428; and 4,938,563).

For example, in one embodiment of the invention the core sheet may include a binder layer at the topmost side, a spacecoat layer that includes polyvinyl butyral, for example, under the binder layer, a monolayer of microspheres having bottommost and topmost surfaces, the bottommost surfaces embedded in the spacecoat layer and the topmost surfaces embedded in the binder layer, a reflective material underlying the monolayer of microspheres and a pressure sensitive adhesive layer at the bottommost side. The binder layer may include, for example, a polyvinyl butyral or a synthetic polyester resin crosslinked with a butylated melamine resin. The thickness of the binder layer typically is about 20 microns to about 120 microns thick. The microspheres typically are made of glass, have refractive indices of about 2.1 to about 2.3, and have diameters ranging from about 30 microns to about 200 microns, preferably averaging about 60 microns in diameter. The microspheres generally are embedded about 50 percent in the binder layer. The spacecoat layer typically has a thickness extending from the surface of the microsphere of approximately one fourth the average diameter of the microspheres. The reflective material may be a layer of metal flakes or vapor or chemically deposited metal layer such as aluminum or silver.

One method of forming a receptive print layer as part of a polymeric sheeting material includes: a) providing a polymeric sheet, preferably, a core sheet that includes retroreflective elements; b) applying a radiation curable composition onto the polymeric sheet; and c) curing the composition to yield a polymeric sheeting material having a receptive print layer. Preferred receptive print layer compositions can be applied using many convenient techniques, including for example, dipping, spraying, flood coating, curtain coating, roll coating, bar coating, knife coating, wire-wound coating, or gravure coating. Persons skilled in the art can readily select one of these or other suitable application methods for specific uses. After application to the polymeric sheet, the composition is typically and preferably exposed to radiation to make a polymeric sheeting material having an upper, exposed surface formed by the receptive print layer.

The compositions of the present invention are advantageous in that polymeric sheeting materials can be constructed with a single layer that not only contributes to functional properties formerly requiring multiple layers such as cover layers, clear coats, and the like, but furthermore is directly printable using resin-based colorant/binder. Thus, the construction of sheetings by the methods of the invention may be greatly simplified.

Validation stickers are only one example of the types of signage articles encompassed by the present invention. The materials of the adhesion-enhancing surface, which is preferably a radiation cured material, and more preferably, a distinct radiation cured receptive print layer, and the marking materials are chosen such that the article possesses one or more of the following desired properties: (1) abrasion resistance; (2) good adhesion between the various layers of an article or between the indicia and the receptive print layer; (3) solvent resistance, particularly gasoline resistance; (4) printability; and (5) weatherability. Weatherability refers to characteristics such as maintenance of retroreflective brightness, resistance to dirt, and/or resistance to yellowing under normal use conditions in the outdoors, where sunlight, temperature, and other environmental parameters may affect sheeting performance. Preferably, these properties can be obtained without the need for a protective coating over the marking material (i.e., a cover layer).

Tests described in the Examples section can be used to determine if articles of the present invention possess one or more of the above-listed properties. Generally, the adhesion enhancing surface, (preferably, a receptive print layer, and more preferably, a radiation cured coating) and the marking materials can be tested separately.

Typically, less of the marking material is removed after one or more of the test procedures described is performed compared to the amount of marking material removed from the same article under the same conditions when the receptive print layer is not present. Preferably, the marking materials are not substantially removed after one or more of the test procedures described in the Examples section is performed. By this it is meant that there is no more than about 50%, preferably, no more than about 25%, and more preferably, no more than about 10%, of the marking material removed after conducting a desired test. The amount of marking material removed can be determined qualitatively. Alternatively, it can be determined quantitatively by measuring the print density before and after each test using a densitometer.

The impact on the adhesion-enhancing surface of the test procedures can be determined qualitatively or quantitatively as well. For example, for a separate receptive print layer, the amount of material removed can be determined qualitatively or quantitatively. Preferably, the receptive print layer is not substantially removed after one or more of the test procedures described in the Examples section is performed. By this it is meant that there is no more than about 50%, preferably, no more than about 25%, and more preferably, no more than about 10%, of the receptive print layer removed after conducting a desired test. The amount of receptive print layer removed can be determined by measuring the color density before and after each test using a densitometer if the receptive print layer is colored. Alternatively, the impact on the adhesion-enhancing surface can be determined by measuring the amount of gloss removed using a gloss meter after conducting a desired test.

For example, preferably, the marking material (or just the receptive print layer) is not substantially removed upon wiping the marking material (or just the receptive print layer) with gasoline for 5 cycles, preferably, 10 cycles, and more preferably, 25 cycles. Preferably, the marking material (or just the receptive print layer) is not substantially removed upon abrading the marking material (or just the receptive print layer) for 1000 scrub cycles. Preferably, the marking material (or just the receptive print layer) is not substantially removed upon applying a pressure sensitive adhesive-coated tape to the marking material (or just the receptive print layer) under thumb pressure and removing it.

Adhesion-Enhancing Surface

Surface 14 (FIG. 1) can be an organic noncellulosic polymeric surface to which marking materials can be directly applied, or it can be coated with another organic polymeric material (i.e., a receptive print layer) that enhances adhesion of the marking materials. Preferably, such material is a radiation cured material. Unexpectedly, radiation cured material is receptive to a wide variety of marking materials using a wide variety of printing systems. Typically, the material is an oligomeric or polymeric material. It can be prepared from a precursor that is applied as a fluid capable of flowing sufficiently so as to be coatable, and then solidifying to form a film. Alternatively, it can be applied as a preformed film. The solidification can be achieved by curing (i.e., polymerizing and/or crosslinking) and/or by drying (e.g., driving off a liquid), or simply upon cooling. The precursor can be an organic solvent-borne, water-borne, or 100% solids (i.e., a substantially solvent-free) composition. That is, the organic polymeric surface of the articles of the present invention may be formed from a 100% solids formulation or it may be coated out of a solvent (e.g., a ketone, tetrahydrofuran, or water) with subsequent drying and/or curing. Preferably, the precursor is a 100% solids formulation, which is substantially solvent-free (i.e., less than about 1 wt-%). By this it is meant that there is less than about 1 wt-% nonreactive diluent (as defined below) present in the precursor. Thus, the precursor can simply dry to form a coating, or the components of the precursor can polymerize and/or crosslink using a wide variety of curing mechanisms (e.g., oxidative cure as a result of oxygen in the air, thermal cure, moisture cure, high energy radiation cure, condensation polymerization, addition polymerization, and combinations thereof).

A preferred precursor is one that is capable of irreversibly forming a cured oligomeric/polymeric material and is often used interchangeably with the term "thermosetting" precursor. The term "thermosetting" precursor is used herein to refer to reactive systems that irreversibly cure upon the application of heat and/or other sources of energy, such as E-beam, ultraviolet, visible, etc., or with time upon the addition of a chemical catalyst, moisture, and the like. The term "reactive" means that the components of the precursor react with each other (or self react) either by polymerizing, crosslinking, or both, using any of the mechanisms listed above.

Components selected for use in the precursor can be used to enhance durability and weatherability of the article, such as the retroreflective sheeting of a validation sticker. Depending on the sheeting construction, various components of the precursor preferably interact with the underlying surface (for example, if the construction includes a radiation cured coating on an underlying organic polymeric material). The term "interact" refers to a variety of mechanisms of interaction, such as surface roughening, dissolution, or interpenetration. There could also be a covalent interaction (e.g., polymerizing and/or crosslinking) between components of the precursor and the underlying surface.

The precursors can include reactive or nonreactive components. Nonreactive precursors typically include polymers or oligomers dissolved or dispersed in nonreactive volatile liquids, although 100% solids systems can also be used. This can include, for example, a thermoplastic coated out of a solvent or coated as a hot melt, and a latex coated out of water. Although they can be used, nonreactive precursors are not preferred, however.

Preferably, materials suitable for forming the adhesion-enhancing surface are precursors comprising reactive components, i.e., materials capable of being crosslinked and/or polymerized by a wide variety of mechanisms (e.g., oxidative cure, condensation, moisture cure, radiation or thermal cure of free radical systems, etc, or combinations thereof). Examples include, but are not limited to: amino resins (i.e., aminoplast resins) such as alkylated urea-formaldehyde resins, melamine-formaldehyde resins, and alkylated benzoguanamine-formaldehyde resins; acrylate resins (including acrylates and methacrylates) such as vinyl acrylates, acrylated epoxies, acrylated urethanes, acrylated polyesters, acrylated acrylics, acrylated polyethers, acrylated oils, and acrylated silicones; alkyd resins such as urethane alkyd resins; polyester resins; reactive urethane resins; phenol formaldehyde resins (i.e., phenolic resins) such as resole and novolac resins; phenolic/latex resins; epoxy resins such as bisphenol epoxy resins; isocyanates; isocyanurates; polysiloxane resins including alkylalkoxysilane resins; reactive vinyl resins; and the like. As used herein, "resins" or "resin systems" refer to polydisperse systems containing monomers, oligomers, polymers, or combinations thereof.

Such reactive precursor components are capable of being cured by a variety of mechanisms (e.g., condensation or addition polymerization) using, for example, thermal energy, radiation energy, etc. Rapidly acting forms of radiation energy (e.g., requiring application for less than five minutes and preferably for less than five seconds) are particularly preferred. Electron beam (E-beam) radiation is especially desired because of its ability to penetrate heavily pigmented coatings, its speed and efficient use of applied energy, and its ease of control. Other useful forms of radiation energy include ultraviolet light, nuclear radiation, infrared, and microwave radiation. Depending on the particular curing mechanism, the precursor can further include a catalyst, initiator, or curing agent to help initiate and/or accelerate the polymerization and/or crosslinking process.

Reactive precursor components capable of being cured by thermal energy and/or time with the addition of catalysts include, for example, phenolic resins such as resole and novolac resins; epoxy resins such as bisphenol A epoxy resins; and amino resins such as alkylated urea-formaldehyde resins, melamine-formaldehyde resins, and alkylated benzoguanamine-formaldehyde resins. The precursors containing reactive components such as these can include free radical thermal initiators, acid catalysts, etc., depending on the resin system. Examples of thermal free radical initiators include peroxides such as benzoyl peroxide and azo compounds. Typically, such reactive precursor components need temperatures greater than room temperature (i.e., about 25EC to about 30EC) to cure, although room-temperature curable systems are known.

More preferred precursors are those that are curable using radiation. These are referred to herein as radiation curable materials. As used herein, "radiation cure" or "radiation curable" refers to curing mechanisms that involve polymerization and/or crosslinking of resin systems upon exposure to ultraviolet radiation, visible radiation, electron beam radiation, or combinations thereof, optionally with the appropriate catalyst or initiator. Typically, there are two types of radiation cure mechanisms that occur—free radical curing and cationic curing. These usually involve one stage curing or one type of curing mechanism. Mixtures of free radical and cationic materials may also be cured to impart desired properties from both systems. Also possible are dual-cure and hybrid-cure systems, as discussed below.

In cationic systems, cationic photoinitiators react upon exposure to ultraviolet light to decompose to yield an acid catalyst. The acid catalyst propagates a crosslinking reaction via an ionic mechanism. Epoxy resins, particularly cycloaliphatic epoxies, are the most common resins used in cationic curing, although aromatic epoxies and vinyl ether based oligomers can also be used. Furthermore, polyols can be used in cationic curing with epoxies as chain-transfer agents and flexibilizers. Also, epoxysiloxanes as disclosed in Eckberg et al. "UV Cure of Epoxysiloxanes," *Radiation Curing in Polymer Science and Technology: Volume IV, Practical Aspects and Applications*, Fouassier and Rabek, eds. Elsevier Applied Science, NY, Chapter 2, 19-49 (1993) can be cured using a cationic photoinitiator. The cationic photoinitiators include salts of onium cations, such as arylsulfonium salts, as well as organometallic salts. Examples of cationic photoinitiators are disclosed in U.S. Pat. Nos. 4,751,138 (Tumey et al.) and 4,985,340 (Palazzotti), and European Patent Application Nos. 306,161 and 306,162. A suitable photoinitiator for epoxysiloxanes is the photoactive iodonium salt available under the trade designation UV9310C from GE Silicones. Waterford, N.Y.

In free radical systems, radiation provides very fast and controlled generation of highly reactive species that initiate polymerization of unsaturated materials. Examples of free radical curable materials include, but are not limited to, acrylate resins, aminoplast derivatives having pendant alpha,beta-unsaturated carbonyl groups, isocyanurate derivatives having at least one pendant acrylate group, isocyanate derivatives having at least one pendant acrylate group, unsaturated polyesters (e.g., the condensation products of organic diacids and glycols), polyene/thiol/silicone systems, and other ethylenically unsaturated compounds, and mixtures and combinations thereof. Such radiation curable systems are discussed in greater detail in Allen et al., "UV and Electron Beam Curable Pre-Polymers and Diluent Monomers: Classification, Preparation and Properties," *Radiation Curing in Polymer Science and Technology: Volume I, Fundamentals and Methods*, Fouassier and Rabek, eds. Elsevier Applied Science, NY. Chapter 5, 225-262 (1993); *Federation Series on Coatings Technology: Radiation Cured Coatings*, Federation of Societies for Coatings Technology, Philadelphia, Pa., pages 7-13 (1986); and *Radiation Curing Primer I: Inks, Coatings, and Adhesives*, RadTech International North America, Northbrook, Ill., pages 45-53 (1990).

Free radical curable systems can be cured using radiation energy, although they can be cured using thermal energy, as long as there is a source of free radicals in the system (e.g., peroxide or azo compound). Thus, the phrase "radiation curable," and more particularly the phrase "free radical curable," include within their scope systems that also can be cured using thermal energy and that involve a free radical curing mechanism. In contrast, the phrase "radiation cured" refers to systems that have been cured by exposure to radiation energy (not thermal).

Suitable acrylate resins for use in the present invention include, but are not limited to, acrylated urethanes (i.e., urethane acrylates), acrylated epoxies (i.e., epoxy acrylates), acrylated polyesters (i.e., polyester acrylates), acrylated acrylics, acrylated silicones, acrylated polyethers (i.e., polyether acrylates), vinyl acrylates, and acrylated oils. As used herein, the terms "acrylate" and "acrylate-functional" include both acrylates and methacrylates, whether they be monomers, oligomers, or polymers.

Acrylated urethanes are diacrylate esters of hydroxy terminated NCO extended polyesters or polyethers. These are particularly preferred. They can be aliphatic or aromatic, although acrylated aliphatic urethanes are preferred because they are less susceptible to weathering. Examples of commercially available acrylated urethanes include those known by the trade designations PHOTOMER (e.g. PHOTOMER 6010) from Henkel Corp., Hoboken, N.J.; EBECRYL 220 (hexafunctional aromatic urethane acrylate of molecular weight 1000), EBECRYL 284 (aliphatic urethane diacrylate of 1200 molecular weight diluted with 1,6-hexanediol diacrylate), EBECRYL 4827 (aromatic urethane diacrylate of 1600 molecular weight), EBECRYL 4830 (aliphatic urethane diacrylate of 1200 molecular weight diluted with tetraethylene glycol diacrylate), EBECRYL 6602 (trifunctional aromatic urethane acrylate of 1300 molecular weight diluted with trimethylolpropane ethoxy triacrylate), and EBECRYL 8402 (aliphatic urethane diacrylate of 1000 molecular weight) from UCB Radcure Inc., Smyrna, Ga.; SARTOMER (e.g., SARTOMER 9635, 9645, 9655, 963-B80, 966-A80) from Sartomer Co., West Chester, Pa.; and UVITHANE (e.g., UVITHANE 782) from Morton International, Chicago, Ill.

Acrylated epoxies are diacrylate esters of epoxy resins, such as the diacrylate esters of bisphenol A epoxy resin. Examples of commercially available acrylated epoxies include those known by the trade designations EBECRYL 600 (bisphenol A epoxy diacrylate of 525 molecular weight), EBECRYL 629 (epoxy novolac acrylate of 550 molecular weight), and EBECRYL 860 (epoxidized soya oil acrylate of 1200 molecular weight) from UCB Radcure Inc., Smyrna, Ga.; and PHOTOMER 3016 (bisphenol A epoxy diacrylate), PHOTOMER 3038 (epoxy acrylate/tripropylene glycol diacrylate blend), PHOTOMER 3071 (modified bisphenol A acrylate), etc. from Henkel Corp., Hoboken, N.J.

Acrylated polyesters are the reaction products of acrylic acid with a dibasic acid/aliphatic/diol-based polyester. Examples of commercially available acrylated polyesters include those known by the trade designations PHOTOMER 5007 (hexafunctional acrylate of 2000 molecular weight), PHOTOMER 5018 (tetrafunctional acrylate of 1000 molecular weight), and other acrylated polyesters in the PHOTOMER 5000 series from Henkel Corp., Hoboken. NJ; and EBECRYL 80 (tetrafunctional modified polyester acrylate of 1000 molecular weight), EBECRYL 450 (fatty acid modified polyester hexaacrylate), and EBECRYL 830 (hexafunctional polyester acrylate of 1500 molecular weight) from UCB Radcure Inc., Smyrna, Ga.

Acrylated acrylics are acrylic oligomers or polymers that have reactive pendant or terminal acrylic acid groups capable of forming free radicals for subsequent reaction. Examples of commercially available acrylated acrylics include those known by the trade designations EBECRYL 745, 754, 767, 1701, and 1755 from UCB Radcure Inc. Smyrna. GA.

Acrylated silicones, such as room temperature vulcanized silicones, are silicone-based oligomers or polymers that have reactive pendant or terminal acrylic acid groups capable of forming free radicals for subsequent reaction. These and other acrylates are discussed in Allen et al., "UV and Electron Beam Curable Pre-Polymers and Diluent Monomers: Classification, Preparation and Properties," *Radiation Curing in Polymer Science and Technology: Volume I, Fundamentals and Methods*, Fouassier and Rabek, eds., Elsevier Applied Science, NY, Chapter 5, 225-262 (1993); *Federation Series on Coatings Technology: Radiation Cured Coatings*, Federation of Societies for Coatings Technology, Philadelphia, Pa., pages 7-13 (1986); and *Radiation Curing Primer I: Inks, Coatings, and Adhesives*, RadTech International North America, Northbrook, Ill., pages 45-53 (1990).

Isocyanurate derivatives having at least one pendant acrylate group and isocyanate derivatives having at least one pendant acrylate group are further described in U.S. Pat. No. 4,652,274 (Boetcher et al.). Examples of isocyanurate resins with acrylate groups include a triacrylate of tris(hydroxy ethyl) isocyanurate.

Radiation curable aminoplast resins have at least one pendant alpha,beta-unsaturated carbonyl group per molecule or oligomer. These unsaturated carbonyl groups can be acrylate, methacrylate, or acrylamide type groups. Examples of resins with acrylamide groups include N-(hydroxymethyl)-acrylamide, N,N'-oxydimethylenebisacrylamide, ortho- and para-acrylamidomethylated phenol, acrylamidomethylated phenolic novolac, glycoluril acrylamide, acrylamidomethylated phenol, and combinations thereof. These materials are further described in U.S. Pat. Nos. 4,903,440 (Larson et al.), 5,055,113 (Larson et al.), and 5,236,472 (Kirk et al.).

Other suitable ethylenically unsaturated resins include monomeric, oligomeric, and polymeric compounds, typically containing ester groups, amide groups, and acrylate groups. Such ethylenically unsaturated compounds preferably have a molecular weight of less than about 4,000. They are preferably esters made from the reaction of compounds containing aliphatic monohydroxy groups or aliphatic polyhydroxy groups and unsaturated carboxylic acids, such as acrylic acid, methacrylic acid, itaconic acid, maleic acid, and the like. Representative examples of acrylate resins are listed elsewhere herein. Other ethylenically unsaturated resins include monoallyl, polyallyl, and polymethallyl esters and amides of carboxylic acids, such as diallyl phthalate, diallyl adipate, and N,N-diallyladipamide, as well as styrene, divinyl benzene, vinyl toluene. Still others include tris(2-acryloyl-oxyethyl)-isocyanurate, 1,3,5-tri(2-methyacryloxyethyl)-s-triazine, acrylamide, methylacrylamide, N-methylacrylamide, N,N-dimethylacrylamide, N-vinylpyrrolidone, N-vinylcaprolactam, and N-vinylpiperidone.

In dual-cure resin systems, the polymerization or crosslinking occur in two separate stages, via either the same or different reaction mechanisms. In hybrid-cure resin systems, two mechanisms of polymerization or crosslinking occur at the same time on exposure to ultraviolet or E-beam radiation. The chemical curing mechanisms that can occur in these systems include, but are not limited to, radical polymerization of acrylic double bonds, radical polymerization of unsaturated polyesters of styrene or other monomers, air drying of allyl functions, cationic curing of vinyl ethers or epoxies, condensation of isocyanates, and acid-catalyzed thermal curing. Thus, the dual-cure and hybrid-cure systems can combine radiation curing with thermal curing, or radiation curing with moisture curing, for example. A combination of E-beam curing with ultraviolet curing is also possible. Combining curing mechanisms can be accomplished, for example, by mixing materials with two types of functionality on one structure or by mixing different materials having one type of functionality. Such systems are discussed in Peeters, "Overview of Dual-Cure and Hybrid-Cure Systems in Radiation Curing," *Radiation Curing in Polymer Science and Technology: Volume III, Polymer Mechanisms*, Fouassier and Rabek, eds., Elsevier Applied Science, NY, Chapter 6, 177-217 (1993).

Of the radiation curable materials, free radical curable materials are preferred. Of these, the acrylates are particularly preferred for use in the precursors of the present invention. Examples of such materials include, but are not limited to, mono- or multi-functional acrylates (i.e., acrylates and methacrylates), acrylated epoxies, acrylated polyesters, acrylated aromatic or aliphatic urethanes, acrylated acrylics, acrylated silicones, etc., and combinations or blends thereof. These can be monomers or oligomers (i.e., moderately low molecular weight polymers typically containing 2-100 monomer units, and often 2-20 monomer units) of varying molecular weight (e.g. 100-2000 weight average molecular weight). Preferred precursors include acrylated epoxies, acrylated polyesters, acrylated aromatic or aliphatic urethanes, and acrylated acrylics. More preferred precursors include acrylated aromatic or aliphatic urethanes, and most preferred precursors include acrylated aliphatic urethanes.

Free radical radiation curable systems often include oligomers and/or polymers (also often referred to as film formers) that form the backbone of the resultant cured material, and reactive monomers (also often referred to as reactive diluents) for viscosity adjustment of the curable composition. Although the film formers are typically oligomeric or polymeric materials, some monomeric materials are also capable of forming a film. Typically, systems such as these require the use of ultraviolet or E-beam radiation. Ultraviolet curable systems also typically include a photoinitiator. Water or organic solvents can also be used to reduce the viscosity of the system (therefore acting as unreactive diluents), although this typically requires thermal treatment to flash off the solvent. Thus, the precursors of the present invention preferably do not include water or organic solvents. That is, they are preferably 100% solids formulations.

Preferred precursors of the present invention include a reactive diluent and a film former. The reactive diluent includes at least one mono- or multi-functional monomeric compound. As used herein, monofunctional means that compound contains one carbon-carbon double bond, and multi-functional means that the compound contains more than one carbon-carbon double bond or another chemically reactive group that can crosslink through condensation. Examples of resins with a carbon-carbon double bond and another chemically reactive group include isocyanatoethyl methacrylate, isobutoxymethyl acrylamide, and methacryloxy propyl trimethoxy silane. Suitable reactive diluents are those typically used in radiation curable systems for controlling viscosity. They are preferably acrylates, although non-acrylates such as n-vinyl pyrrolidone, limonene, and limonene oxide, can also be used, as long as the monomers are ethylenically unsaturated, which provides for their reactivity. The film former includes at least one radiation curable material, such as the mono- or multi-functional oligomeric compounds typically used in radiation curable systems, although thermoplastic polymers can also be used. These thermoplastic polymers may or may not be reactive with the reactive diluent or self-reactive (e.g., internally crosslinkable).

Preferably, the precursor includes at least one monofunctional monomeric compound and at least one multifunctional oligomeric compound. Most preferably, such precursors include at least one monofunctional monomeric acrylate having a molecular weight of no greater than about 1000 (preferably, about 100-1000) and at least one multifunctional oligomeric acrylated urethane having a molecular weight of at least about 500, preferably, about 500 to about 7000, and more preferably, about 1000 to about 2000.

Monofunctional monomers typically tend to lower the viscosity of the blend and provide faster penetration into the underlying layer. Multifunctional monomers and oligomers (e.g., diacrylates and triacrylates) typically tend to provide more crosslinked, stronger bonds between layers and within the layer. Also, depending on their structures, the multifunctional monomers and oligomers can impart flexibility or rigidity. Acrylated oligomers, preferably acrylated urethane oligomers, impart desirable properties to the coating, such as toughness, hardness, and flexibility.

Examples of suitable monofunctional monomers include, but are not limited to, ethyl acrylate, methyl methacrylate, isooctyl acrylate, oxethylated phenol acrylate, isobornyl acrylate, 2-ethylhexyl acrylate, 2-phenoxyethyl acrylate, 2-(ethoxyethoxy)ethyl acrylate, ethylene glycol methacrylate, tetrahydroxy furfuryl acrylate (THF acrylate), caprolactone acrylate, and methoxy tripropylene glycol monoacrylate. Examples of suitable multifunctional monomers include, but are not limited to, triethylene glycol diacrylate, pentaerythritol triacrylate, glycerol triacrylate, glycerol trimethacrylate, glyceryl propoxylate triacrylate, trimethylolpropane trimethacrylate, trimethylolpropane triacrylate, 1,6-hexanediol diacrylate, 1,4-butanediol diacrylate, tetramethylene glycol diacrylate, tripropylene glycol diacrylate, ethylene glycol dimethacrylate, ethylene glycol diacrylate, polyethylene glycol diacrylate, pentaerythritol tetraacrylate, pentaerythritol tetramethacrylate, and 1,6-hexane diacrylate. Other mono- and multi-functional monomers include vinyl acetate, N-vinyl formamide, N-vinyl caprolactam, ethoxyethoxyethyl acrylate, etc. The monomers are available under the trade designations EBECRYL from UCB Radcure Inc., Smyrna, Ga., PHOTOMER from Henkel Corp., Hoboken, N.J., and SARTOMER from Sartomer Co., West Chester, Pa. Limonene oxide is from Aldrich Chemical Co., Milwaukee, Wis. The N-vinyl pyrrolidinone is from Kodak, Rochester, N.Y.

Examples of suitable acrylated oligomers include, but are not limited to, acrylated epoxies, acrylated polyesters, acrylated aromatic or aliphatic urethanes, acrylated silicones, acrylated polyethers, vinyl acrylates, acrylated oils, and acrylated acrylics. Of these, acrylated aromatic or aliphatic urethanes are preferred, and acrylated aliphatic urethanes are more preferred because of their flexibility and weatherability. Examples of some acrylated aliphatic urethanes (i.e., aliphatic urethane acrylates) include those available under the trade designations PHOTOMER 6010 (MW=1500), from Henkel Corp., Hoboken, N.J.; EBECRYL 8401 (MW=1000) and EBECRYL 8402 (MW=1000, urethane diacrylate), from UCB Radcure Inc., Smyrna, Ga.; S-9635, S-9645, and S-9655, all of which contain 25% by weight isobornyl acrylate, and are available from Sartomer Co., West Chester, Pa.; S-963-B80, which contains 20% by weight 1,6-hexanediol diacrylate and is available from Sartomer Co.; and S-966-A80, which contains 20% by weight tripropylene glycol diacrylate and is available from Sartomer Co.

The precursor may contain various solvents other than the diluent monomers discussed above to help solubilize the higher molecular weight reactive resins (e.g., the acrylated oligomers) and/or the thermoplastic polymers. Such solvents are referred to as nonreactive diluents or nonreactive monomers as they do not significantly polymerize or crosslink with the reactive resins of the precursor, for example, under the curing conditions of the method of the present invention. Furthermore, such solvents are typically driven off by heat, although complete elimination is not necessarily required. Suitable solvents for this purpose include various ketone solvents, tetrahydrofuran, xylene, and the like. Alternatively, and preferably, however, the precursor is a 100% solids composition as defined above.

Colorants (i.e., pigments and dyes) can also be included in the precursor if desired. Examples of suitable colorants include $TiO_2$, phthalocyanine blue, carbon black, basic carbonate white lead, zinc oxide, zinc sulfide, antimony oxide, zirconium oxide, lead sulfochromate, bismuth vanadate, bismuth molybdate, as well as other pigments, particularly opaque pigments disclosed in U.S. Pat. No. 5,272,562 (Coderre) and the organic pigments disclosed in U.S. Pat. No. 5,706,133 (Orensteen). The colorant can be used in an amount to impart the desired color, and can be added to the precursor in a variety of ways.

Preferably, the precursors include a reactive diluent in an amount of about 5 wt-% to about 25 wt-%, based on the weight of the total precursor. The amounts of the film former and optional pigment in the precursor depends on the desired opacity, flexibility, viscosity, etc. Preferably, the precursors include a film former in an amount of about 25 wt-% to about 95 wt-%, and pigment in an amount of no greater than about 50 wt-%, based on the total weight of the precursor.

A photoinitiator is typically included in ultraviolet curable precursors of the present invention. Illustrative examples of photopolymerization initiators (i.e., photoinitiators) include, but are not limited to organic peroxides, azo compounds, quinones, benzophenones, nitroso compounds, acryl halides, hydrozones, mercapto compounds, pyrylium compounds, triacrylimidazoles, bisimidazoles, chloroalkylriazines, benzoin ethers, benzil ketals, thioxanthones, and acetophenone derivatives, and mixtures thereof. Specific examples include benzil, methyl o-benzoate, benzoin, benzoin ethyl ether, benzoin isopropyl ether, benzoin isobutyl ether, benzophenone/tertiary amine, acetophenones such as 2,2-diethoxyacetophenone, benzyl methyl ketal, 1-hydroxycyclohexylphenyl ketone, 2-hydroxy-2-methyl-1-phenylpropan-1-one, 1-(4-isopropylphenyl)-2-hydroxy-2-methylpropan-1-one, 2-benzyl-2-N,N-dimethylamino-1-(4-morpholinophenyl)-1-butanone, 2,4,6-trimethylbenzoyl-diphenylphosphine oxide, 2-methyl-1-4(methylthio), phenyl-2-morpholino-1-propanone, bis(2,6-dimethoxybenzoyl)(2,4,4-trimethylpentyl) phosphine oxide, etc. Such photoinitiators include those available under the trade designations DAROCUR and IRGACURE available from Ciba-Geigy Corp., Ardsley, N.Y. Typically, a photoinitiator is used in an amount to impart desired reaction rates. Preferably, it is used in an amount of about 0.01 wt-% to about 5 wt-%, and more preferably about 0.1 wt-% to about 1 wt-%, based on the total weight of the precursor.

Other additives that can be included within the precursor are fillers, defoamers, adhesion promoters, flattening agents (e.g., flow agents such as polydimethylsiloxane), wetting agents, slip aids, stabilizers including additives used for outdoor stability (e.g., thermal stabilizers, UV stabilizers, visible light stabilizers), plasticizers, adhesion promoters, etc. These can be reactive or nonreactive; however, they are typically nonreactive. Examples of reactive plasticizers are available under the trade designations SARBOX SB-600 and SB-510E35 from Sartomer Co. Typically, such additives are used in amounts to impart desired characteristics. Preferably, they are used in amounts of about 0.01 to about 5 wt-%, and more preferably about 0.1 to about 1 wt-%, based on the total weight of the precursor.

Any suitable method of applying the precursor can be used in connection with the present invention. The choice of coating method will depend on the viscosity of the precursor, the desired thickness of the coating, coating speed, etc. Suitable coating methods are described above. Typically, wet coating thicknesses of about 10 microns to about 250 microns are used.

After the precursor is coated onto the underlying surface, it is preferably exposed to an energy source to initiate cure. Examples of suitable and preferred energy sources include thermal energy and radiation energy. The amount of energy depends upon several factors such as the resin chemistry, the dimensions of the precursor after it is coated, and the amount and type of optional additives, particularly pigment load. For thermal energy, the temperature is about 30° C. to about 100° C. The exposure time can range from about 5 minutes to over 24 hours, longer times being appropriate for lower temperatures.

Suitable radiation energy sources for use in the invention include electron beam, ultraviolet light, visible light, or combinations thereof. Electron beam radiation, which is also known as ionizing radiation, can be used at an energy level of about 0.1 Mrad to about 10 Mrad, preferably, at an energy level of about 3 Mrad to about 8 Mrad, and more preferably, about 5 Mrad to about 6 Mrad; and at an accelerating voltage level of about 75 KeV to about 5 meV, preferably, at an accelerating voltage level of about 100 KeV to about 300 KeV. Ultraviolet radiation refers to nonparticulate radiation having a wavelength within the range of about 200 nanometers to about 400 nanometers. It is preferred that 118-236 watts/cm ultraviolet lights are used. Visible radiation refers to nonparticulate radiation having a wavelength within the range of about 400 nanometers to about 800 nanometers. If radiation energy is employed, some pigment particles and/or other optional additives may absorb the radiation energy to inhibit polymerization of the resin in the precursor. If this is observed, higher doses of radiation energy and/or higher levels of photoinitiator can be used to the extent needed to compensate for such radiation absorbance. Also, the E-beam accelerating voltage may be increased to thereby increase penetration of the ionizing radiation energy.

Marking Materials

Suitable marking materials are as those that are used by different printing processes to mark areas with a color, for example, other than the background (substrate color) such that the information printed can be discerned in some manner. Generally, such marking materials form indicia that is readable to the unaided eye and may be in the form of selected alphanumeric characters or other symbols, e.g., bar codes, emblems, etc., in desired colors. If desired, however, the information may be readable by other means, e.g., machine readable infrared images. Examples of such marking materials are those typically used in noncontact printers (e.g., toners used in laser printers) as well as impact printers (e.g., ink-containing ribbons used in thermal mass transfer). Generally, each printing process requires different marking materials to produce printed images. Some marking materials have been developed especially to eliminate starch anti-set-off spray in sheet-fed printing and air pollution from heat-set ink solvents in web printing. There are marking materials that simulate metallic luster, that print magnetic characters which can be read on special electronic equipment, that are alcohol and scuff-resistant for liquor labels, that are alkali-resistant for soap packages, that are fluorescent, and that have high brilliance for attractive displays. There are inks specifically designed for use in screen printing, letterpress printing, gravure printing, and flexographic printing. Many of these are radiation curable (e.g., ultraviolet (UV) and electron beam (EB) curing inks), which have been developed to eliminate the environmental problems associated with sprayable and solvent-based materials. UV curing marking materials typically contain liquid prepolymers (oligomers and/or monomers), and initiators which on exposure to large doses of UV radiation release free radicals that instantly polymerize the vehicle to a dry, tough thermosetting resin. E-beam (EB) curing marking materials are similar but do not include initiators.

Marking materials typically are formulated for the specific printing process with which they are to be used to produce printed images. In general, suitable marking materials for use in the present invention contain a colorant (e.g., pigments or dyes), resin vehicles (i.e., binders) in which the colorant is dissolved or dispersed, optional solvents or other fluids to control body, and other optional additives to induce drying and/or impart desired working properties. Some of the components for the marking materials used in various printing processes may come from the same family of materials, but their specific properties may have been tailored to the processing conditions the printing technology may require. For example, a resin from the polyester family may be used as a binder for screen printing, electrophotography, thermal transfer, etc., but it's molecular weight, degree of crosslinking, and specific monomers chosen may be different for each process.

For good adhesion to the adhesion-enhancing surface of the articles of the present invention, particularly the radiation cured materials, the binder of the marking materials preferably includes reactive components, i.e., materials capable of being crosslinked and/or polymerized by a wide variety of mechanisms (e.g., oxidative cure, condensation, moisture cure, radiation or thermal cure of free radical systems, etc.). More preferably, the binder of the marking material includes a polymer selected from the group of a polyester, a vinyl, a polyolefin, a polyvinyl acetal, an alkyl or aryl substituted acrylate or methacrylate, a copolymer of ethylene or propylene with acrylic acid, methacrylic acid or vinyl acetate, and combinations thereof. A variety of different marking materials applied from a variety of different printers are exemplified in Table 2 in the Examples section.

Colorants and additives can vary for the different types of marking materials and printing systems, and are well known to those skilled in the art. Many suitable colorants and additives are listed above in the discussion of the chemistry of the adhesion-enhancing surface.

Printing Systems

The marking materials described herein can be used in a variety of printing systems, whether impact or noncontact, preferably, digital printing systems, to produce images on the adhesion-enhancing surfaces, particularly the receptive print layers, and more particularly, the radiation cured coatings described herein. These include electrostatic, electrophotographic, ion deposition, magnetographic, inkjet, thermal transfer printing, screen printing, gravure, letter press, and offset press. Many of these are digital printing processes (e.g., electrostatic, electrophotographic, ion deposition, magnetographic, ink jet, and thermal transfer printing) in which data representing the images are in digital form. These processes are used mainly for short runs and printing variable or personalized information printed on demand such as codes, addresses, etc.

The following is a brief description of some of the printing processes that can be used in the methods of the present invention. More detailed information is available in standard printing text books. Examples of such books include *Principles of Non Impact Printing*, by J. L. Johnson, Palantino Press (1986); *Understanding Digital Color*, by Phil Green, Graphic Arts Technical Foundation (1995), pp 293-310; and *Pocket Pal, A Graphic Arts Production Handbook*, edited by M. Bruno, International Paper Co. $16^{th}$ edition (1995), pp. 126-150.

Electrostatic printing consists of an imaging step that involves direct deposition of electrostatic charge onto a surface that has been prepared to be printed followed by the toning step using liquid toners. This is followed by a step that involves fusing the toners with heat and pressure. Printers using this technology are available in wide widths up to 52 inches and are used for printing architectural drawings, billboards, etc. Electrophotographic printing (including laser printing and xerography) is similar to high speed copier systems. An electrophotographic system includes, for example, an electrostatic photoconductor that is charged by a corona discharge lasers modulated by digital signals from a PostScript-based digital imaging system, and a system for transferring a toned image from the photoconductor to a substrate. Systems are in use for printing variable information in single or spot color specialty printing of products at speeds up to 300 feet/minute. Slower systems for 4-color variable and on-demand printing are being used for the short-run color printing market Ion deposition printing, also referred to as electron beam imaging (EBI), consists of four simple steps: (1) a charged image is generated by directing an array of charged particles (electrons) from an imaging cartridge toward a heated rotating drum which consists of very hard anodized aluminum, (2) a single component magnetic toner is attracted to the image on the drum as it rotates, (3) the toned image is transfixed to the receiving surface with pressure, and (4) residual toner is scraped from the drum. It is then ready for reimaging. A new system using new materials is capable of producing high quality continuous-tone four color process images. Magnetographics is similar to EBI printing except that a magnetic drum is used, and a magnetic charge is produced on the drum by a computer-generated variable image and a monocomponent magnetic toner. Its main advantage is ease of imaging with digital data.

Inkjet printing is used mainly for variable printing information such as addresses and codes on computer letters, sweepstake forms, and other personalized direct mail advertising. There are a number of types of inkjet printers: continuous drop, drop-on-demand, bubble-jet, single-jet, and multiple-jet. Images are produced digitally with water soluble dyes. Inkjet printers generate ink droplets, either by forcing a stream through a nozzle or by propelling droplets on demand depending on the image being printed. Drop-on-demand inkjet printers propel ink by thermal (ink vaporization) or piezoelectric methods (phase change).

Thermal mass transfer uses computer-generated digital text and graphics data to drive a thermal printhead that melts spots of ink on doner ribbons and transfers them to a receiver. Systems in use have built-in computers and produce finished labels and other printed products with over 25% variable information in 4 colors laminated and either rotary or flat die-cut.

Screen printing is a unique short run process that prints on almost any surface. Both line art and half tone work can be printed. Some screen printing is done by hand with very simple equipment consisting of a table, screen frame, and a squeegee. Most commercial screen printing, however, is done on power operated presses. During printing, a screen with an ink in the form of a desired image is in intimate contact with a substrate and the ink is forced through the open areas of the screen fabric onto the substrate with a squeegee. Then the printed substrate is dried to remove the solvents from the ink and complete the process.

Gravure printing consists of a printing cylinder, an impression cylinder, and an inking system. Ink (marking material) is applied to the printing cylinder by an air ink roll or spray, and the excess is removed by a doctor blade and returned to the inking fountain. The impression cylinder is covered with a rubber composition that presses the surface to be printed into contact with the ink. Gravure is used in packaging, floor coverings, pressure sensitive wall coverings, plastic laminates, etc.

In the letterpress family there are three major kinds: platen, vertical flatbed cylinder, and rotary. Much commercial work is printed on sheet-fed presses, but most of the long run work (magazines, books, newspaper) is done on web-fed presses. For a more detailed discussion of this type of printing processes see *Pocket Pal, A Graphic Arts Production Handbook* cited above. Offset presses have three printing cylinders as well as inking and damping systems. As the plate cylinder rotates, it comes in contact with the dampening rollers first and then the inking rollers. The dampeners wet the plate so that the nonprinting areas repel ink. The inked image is then transferred to the rubber blanket and the paper is printed as it passes between the blanket and impression cylinders. Web offset presses are capable of running up to 3000 feet/minute and used to produce news papers, magazines, business forms, computer letters, mail order catalogs, gift wrap, etc. For a more detailed discussion of this type of printing processes see *Pocket Pal, A Graphic Arts Production Handbook* cited above.

EXAMPLES

Objects and advantages of this invention are further illustrated by the following examples, but the particular materials and amounts thereof recited in these examples, as well as other conditions and details, should not be construed to unduly limit this invention.

Preparation of Materials

Preparation of Acrylate-Methacrylate Copolymer Receptor. A copolymer of acrylate-methacrylate (3M SCOTCHLITE 880 Clear coat from Minnesota Mining and Manufacturing Co., St. Paul, Minn.) was applied to the surface of retroreflective sheeting (SCOTCHLITE RRS 3750, Minnesota Mining and Manufacturing Co., St. Paul, Minn.) using a K-Coater (from Testing Machines, Inc., Amitville, N.J.) and a KK bar #2 wire bar. Sheeting was then placed in oven at 270° F. for 10 minutes to give a cured film thickness of approximately 1 mil. This is referred to as Coating 2 in Table 1.

Preparation of Ethylene-Vinyl Acetate Copolymer Receptor. Films extruded (1 mil) from resins including Bynel 3101 (an acrylate containing ethylene vinyl acetate copolymer from DuPont Company, Wilmington, Del.), Coating 3, Table 1), Chevron 1305 (an ethylene vinyl acetate copolymer, from Chevron Co., San Francisco, Calif., Coating 5. Table 1), Elvax 260 (an ethylene methacrylate copolymer from DuPont Company, Wilmington, Del., Coating 4, Table 1) were heat and pressure laminated to the surface of retroreflective sheeting (SCOTCHLITE RRS 3750 available from Minnesota Mining and Manufacturing Co., St. Paul, Minn.) at 325° F. using conditions as described in U.S. Pat. No. 4,664,966 (Bailey et al.). These compositions are also solution coatable.

Preparation of Silyl Terminated Sulfopoly(ester-urethane) Receptor. Silyl terminated sulfopoly(ester-urethanes) as described in U.S. Pat. No. 5,756,633 was applied using a K-Coater (from Testing Machines. Inc., Amitville, N.J.) and a KK bar #2 wire bar to the surface of retroreflective sheeting (SCOTCHLITE RRS 3750, Minnesota Mining and Manufacturing Co., St. Paul, Minn.). Sheeting was air-dried to give a cured film thickness of 1 mil. This is referred to as Coating 6 in Table 1.

Preparation of UV Clear Coat Receptor. Receptive print layers (3M SCOTCHLITE 9200 series Clear Coat (Coating 8, Table 1) and 9710 Toner (Coating 7, Table 1), both of which are available from Minnesota Mining and Manufacturing Co., St. Paul, Minn.) were applied to the surface of retroreflective sheeting (SCOTCHLITE RRS 3750, Minnesota Mining and Manufacturing Co., St. Paul, Minn.) using a K-Coater (from Testing Machines, Inc., Amitville, N.J.) and a KK#4 wire bar. The webs were cured by passing under a medium pressure mercury lamp at 27 feet/minute for a dose of 0.324 J/cm$^2$ (American Ultraviolet Co., Murry Hill, N.J.). The dry coating thickness obtained was 0.9 mil for each sample. Alternatively, other wire bars could be used to get thicker or thinner coatings as desired.

In Table 1, the Control is thermal cured polyester-based coating which is the topmost coating on 3M SCOTCHLITE Validation Security Sheeting 5330 (commercially available from Minnesota Mining and Manufacturing Co., St. Paul, Minn.).

Coating 1 in Table 1 is a thermally cured clear coat, which is available under the trade designation WERNEKE ARCXX0013 from Akzo Nobel Inks, Inc., Arnhem, The Netherlands. This material was coated onto the surface of retroreflective sheeting (SCOTCHLITE RRS 3750, Minnesota Mining and Manufacturing Co., St. Paul, Minn.) using a flexographic press and dried in an oven to form a dry coating thickness of 0.3 mil.

Test Procedures:

Adhesion Test. Coated and printed retroreflective sheeting was adhered to a flat conversion coated aluminum weathering panel available from The Q-Panel Co., 26200 First St, Cleveland, Ohio using the adhesive of the retroreflective sheeting. Panels measured 11 inches×2.75 inches. After applying the samples, they were rolled down firmly with a small wallpaper rubber roller (approximately 1.5 inches in diameter). A piece of 3M brand 610 tape (a pressure sensitive adhesive tape available from Minnesota Mining and Manufacturing Co., St. Paul, Minn.) was applied to cover the indicia (or just the receptive print layer) using thumb pressure.

Upon removal of the tape, the amount of material removed was qualitatively evaluated. A rating of 10 means that essentially none of the material was removed whereas a 0 means substantial portion of the material being tested (receptive print layer or marking material) was removed. An adhesion rating of 7, for example. which would depend on thickness of the coating used, is believed to generally correlate to about 70% of the material remaining, although quantitative image density measurements were not made.

Abrasion Resistance Test. Wet scrub abrasion resistance was determined using a modification of the Federal Test Method Standard 141a, Method 6142; Gardner Laboratory Bulletin WG 2000 using a Gardner Model M-105 or the Gardner Straight Line Washability and Abrasion Tester No. 1364.

Samples were prepared by adhering two test samples (coated and printed retroreflective sheeting) adhered using the adhesive of the retroreflective sheeting) to conversion coated aluminum weathering panels available from The Q-Panel Co., 26200 First St, Cleveland, Ohio. Panels measured 11 inches×2.75 inches. After applying the samples, they were rolled down firmly with a small wallpaper rubber roller (approximately 1.5 inches in diameter).

After conditioning a Chinese hogs bristle brush in lukewarm warm water (approximately 100-120° F.) for 30 minutes, the excess water was removed. The brush was then conditioned in a 0.5 percent detergent ("Dreft")) solution for 5 minutes. The Chinese hogs bristle brush was placed in the brushholder of the tester. The test panel was mounted in the test apparatus. The test apparatus was modified slightly to accommodate the 11-inch×2.75-inch test panel. The test cycle consisted of 1,000 scrub cycles. During the test period, a 0.5% detergent ("Dreft") solution was dripped on the test panel at the approximate rate of 12 drops per minute through a titration column (or just enough to keep the panel wet). The test panel was rinsed and dried.

The amount of material removed was qualitatively evaluated. A rating of 10 means that essentially none of the material was removed whereas a 0 means substantial portion of the material being tested (receptive print layer or marking material) was removed. An abrasion rating of 7, for example, is believed to generally correlate to about 70% of the material remaining, although quantitative image density measurements were not made.

Weatherability Test. Outdoor durability performance was estimated using ASTM G53. Samples (coated and printed retroreflective sheeting) were prepared and tested per ASTM procedure G53 (1996) (with a fluorescent UV "B" lamp) using cycle consisting of 4 hours of UV exposure with Black panel temperature of 60° C. followed by a 4 hour condensation cycle at Black panel temperature of 50° C.

The samples were evaluated by comparing each one tested to the same sample that was not tested, which provided a comparative control. The samples were evaluated, for example, for surface changes such as gloss (e.g., receptive print layer gloss), adhesion (e.g., marking material adhesion), fading (e.g., marking material fading), and compared to their comparative controls. A rating scale of 0-10 was used, wherein 10 means that essentially no changes occurred and 0 means that significant changes occurred (e.g., the marking material was gone or the sample fell apart).

Solvent Resistance Test. The resistance to solvents and cleaners was evaluated using the following procedure. Samples were prepared by adhering two test samples of retroreflective sheeting to conversion coated aluminum weathering panels available from The Q-Panel Co., 26200 First St, Cleveland, Ohio. Panels measured 11 inches×2.75 inches. After applying the samples, they were rolled down firmly with a small wallpaper rubber roller (approximately 1.5 inches in diameter). Test Solvents were methyl alcohol, mineral spirits, kerosene, VM & P naphtha, and gasoline (regular unleaded). (Note: Solvents that damage automobile paint or lacquer finishes, should not be used as a test solvent). Test Cleaners were "409", window glass, ammonia, bug and tar cleaner (with petroleum distillates or mineral spirits).

A "Q-tip" type cotton swab (mounted on the end of a stick) was wetted with the respective solvent or test cleaner. The tester held the swab at a 45 degree angle to the test sticker and with approximately 40 grams of pressure (applied by hand), wiped the wet swab back and forth across the printed sticker for 10 cycles (one cycle was once across the sample and back). The tester conducted the same test on a second sample for 25 cycles.

The amount of material removed was qualitatively evaluated. A rating of 10 means that essentially none of the material was removed whereas a 0 means substantial portion of the material being tested (receptive print layer or marking material) was removed. A solvent resistance rating of 7, for example, is believed to generally correlate to about 70% of the material remaining, although quantitative image density measurements were not made.

Although not specifically shown, each of the samples demonstrated a rating of 10 with the solvents "409", window glass, ammonia, bug and tar cleaner, methyl alcohol, and mineral spirits. For kerosene and VM & P naphtha, the ratings were relatively similar to those for gasoline shown in Table 1, but not as severe.

In Table 1, Coatings 1, 2, and 3, by design are protective coatings intended to be solvent resistant, and cleanable such that graffiti and the like can be cleaned. Thus, coatings 1, 2, and 3, which are thermoplastic coatings, are not preferred as they do not have sufficiently high gasoline resistance, although they are printable.

Printability Test. The printability of samples of retroreflective sheeting with the various receptive print layers described above were tested for printability using the printers listed below. A small piece of the coated retroreflective sheeting sample was attached to paper (using the adhesive on the retroreflective sheeting) and sent through the printer by following instructions that came with the printer. An image pattern (repeating text on a page, generated by a word-processing software (Microsoft Word™) was sent to the printer. After printing was done, the test sample was subjected to the tests as described above.

For the printability of the samples listed in Table 1, below, an HP Laser Jet III made by Hewlett Packard Company, Palo Alto, Calif. was used with a toner cartridge 92295A (styrene/acrylic resin).

For the data collected in Table 2, the printers used were:
Laser Jet III made by Hewlett Packard Company, Palo Alto, Calif., with toner cartridge 92295A.
HP Laser Jet III made by Hewlett Packard Company, Palo Alto, Calif., with toner cartridge replacement for 92295A from Laser Sharp, Inc., Hastings, Minn., which is referred to as a MICR toner cartridge.
Minolta Pageworks 8L laser printer made by Minolta Corporation, Peripheral Products Division (PPD), Mahwah, N.J., with the supplied toner cartridge.
HP Model 2000C inkjet printer made by Hewlett Packard Company, Palo Alto, Calif., with the ink cartridges supplied.
Model Phaser III solid inkjet printer made by Tektronix Inc., Wilsonville, Oreg., with ink stick part #016-1123-00.

Model 171 thermal mass transfer printer by Zebra Technologies Corp., Vernon Hills, Ill. with ribbon AD501 from Advent Corp., Romeo, Mich.

Letter Press tests were done using Quickpeek proofing kit from Thwing-Albert Instrument Co., Philadelphia, Pa.

Screen printing was done using a regular screen printing set up with 3M Scotchlite™ 9700 series inks following instructions supplied with the product.

TABLE 1

Performance of Various Coatings on Retroreflective Sheeting.

| Coatings | Adhesion To RRS | Abrasion Resistance | Weatherability | Gasoline Resistance | Printability |
|---|---|---|---|---|---|
| Control—3M 5330 | 10 | 10 | 6 | 10 (25 cycles) | 5 |
| Coating 1—Werneke | 10 | 8 | N/A | 1 (10 cycles) | 5 |
| Coating 2—Acrylic B66 | 10 | 8 | 9 | 4 (10 cycles) | 9 |
| Coating 3—Bynel 3101 | 8 | 5 | N/A | 3 (10 cycles) | 8 |
| Coating 4—Elvax 260 | 8 | 5 | 6 | 5 (10 cycles) | 8 |
| Coating 5—Chevron 1305 | 8 | 5 | N/A | 5 (10 cycles) | 8 |
| Coating 6—Silyl terminated Sulfopolyester-urethane | 8 | 8 | N/A | 10 (25 cycles) | 8 |
| Coating 7—UV system 1 | 10 | 10 | 10 | 5 (10 cycles) | 8 |
| Coating 8—UV system 2 | 10 | 10 | 10 | 8 (25 cycles) | 9 |

Rating system defined as "10" being the best for the given category and "0" being the worst.

TABLE 2

Marking Material Performance on Retroreflective Sheeting with Coating 7 as the Receptive Print Layer.

| Coatings | Marking material binder family | Adhesion To RRS | Abrasion Resistance | Gasoline Resistance | Printability | Weatherability |
|---|---|---|---|---|---|---|
| Toner - LaserJet III | Styrene/acrylic | 4 | 10 | 5 (10 cycles) | 9 | Not Tested |
| Toner - MICR | Styrene/acrylic | 8 | 10 | 6 (25 cycles) | 8 | 8 |
| Toner - Minolta | Polyester | 10 | 10 | 9 (25 cycles) | 10 | 9 |
| InkJet - HP 2000C | None | 10 | Not Tested | 10 (25 cycles) | 7 | Not Tested |
| Solid Inkjet - Phaser III | Polyolefin | 5 | 5 | 5 (10 cycles) | 6 | Not Tested |
| Thermal - Zebra, P0, T0 | Polyolefin Polyester Acrylic | 10 | 10 | 10 (25 cycles) | 8 | 9 |
| Thermal - Zebra, P0, T1 | Polyolefin Polyester Acrylic | 10 | 10 | 10 (25 cycles) | 5 | 9 |
| Thermal - Zebra, P1, T0 | Polyolefin Polyester Acrylic | 10 | 10 | 10 (25 cycles) | 7 | 9 |
| Thermal - Zebra, P1, T1 | Polyolefin Polyester Acrylic | 10 | 10 | 10 (25 cycles) | 3 | 9 |
| Thermal control - Zebra, P1, T1 | Polyolefin Polyester Acrylic | 10 | 10 | 10 (25 cycles) | 9 | 9 |
| Letter Press | Polyester | 10 | 5 | 5 (10 cycles) | 9 | Not Tested |
| Screen Print | Polyester, Acrylic | 10 | 10 | 6 (10 cycles) | 10 | Not Tested |
| Offset printing | Polyester | Not Tested | Not Tested | Not Tested | Not Tested | Not Tested |

Rating system defined as "10" being the best for the given category and "0" being the worst.
P0 and T0 refer to the printer's lowest level settings for pressure and temperature.
P1 and T1 refer to the printer manufacturer's recommended pressure and temperature.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A signage article comprising:
    a substrate comprising a noncellulosic organic polymeric surface,
    a surface exposed to the outdoors comprising a radiation cured coating crosslinked by exposure to radiation selected from the group consisting of ultraviolet radiation, visible radiation, electron beam radiation, and combinations thereof disposed on the noncellulosic organic polymeric surface; and
    a marking material disposed on the radiation cured coating, wherein the marking material is not substantially removed from the signage article upon wiping the marking material with gasoline for five cycles.

2. The signage article of claim 1 wherein the marking material comprises a colorant and a binder and the binder comprises a polymer selected from the group of a polyester, a vinyl, a polyolefin, a polyvinyl acetal, an alkyl or aryl substituted acrylate or methacrylate, a copolymer of ethylene or propylene with acrylic acid, methacrylic acid, or vinyl acetate, and combinations thereof.

3. The signage article of claim 1 wherein the marking material is not substantially removed upon wiping the marking material with gasoline for ten cycles.

4. The signage article of claim 1 wherein the marking material is not substantially removed upon abrading the marking material for 1000 scrub cycles.

5. The signage article of claim 1 wherein the marking material is not substantially removed upon applying a pressure sensitive adhesive-coated tape to the marking material under thumb pressure and removing it.

6. The signage article of claim 1 wherein the radiation cured coating is not substantially removed upon applying a pressure sensitive adhesive-coated tape to the radiation cured coating under thumb pressure and removing it.

7. The signage article of claim 1 wherein the radiation cured coating is not substantially removed upon wiping the radiation cured coating with gasoline for five cycles.

8. The signage article of claim 1 wherein the radiation cured coating is not substantially removed upon abrading the radiation cured coating for 1000 scrub cycles.

9. The signage article of claim 1 wherein the radiation cured coating is pattern coated.

10. The signage article of claim 1 which does not include a protective coating over the marking material.

11. The signage article of claim 1 wherein the article is selected from the group consisting of a labeling product, a product authentication article, a window sticker, an inspection sticker, a parking permit, an expiration sticker, a license plate, a traffic sign, and a road marking.

12. The signage article of claim 1 wherein the substrate comprising a noncellulosic organic polymeric surface comprises retroreflective sheeting.

13. The signage article of claim 12 wherein the retroreflective sheeting is part of a validation sticker.

14. The signage article of claim 1 wherein the radiation cured coating is derived from a UV-curable composition that comprises an acrylate.

15. The signage article of claim 14 wherein the acrylate comprises an aliphatic acrylated urethane.

16. The signage article of claim 15 wherein the marking material is not substantially removed upon wiping the marking material with gasoline for twenty-five cycles.

17. A signage article comprising:
- a retroreflective sheeting comprising an organic polymeric surface;
- a surface exposed to the outdoors comprising a radiation cured coating disposed on the organic polymeric surface wherein the coating comprises an acrylate and the coating is crosslinked by exposure to radiation selected from the group consisting of ultraviolet radiation, visible radiation, electron beam radiation, and combinations thereof;
- a marking material disposed on the radiation cured coating; wherein the marking material is not substantially removed from the signage article upon wiping the marking material with gasoline for five cycles.

18. The signage article of claim 17 wherein the coating comprises an aliphatic acrylated urethane.

* * * * *

UNITED STATES PATENT AND TRADEMARK OFFICE
CERTIFICATE OF CORRECTION

| | | |
|---|---|---|
| PATENT NO. | : 7,964,264 B1 | Page 1 of 2 |
| APPLICATION NO. | : 09/937587 | |
| DATED | : June 21, 2011 | |
| INVENTOR(S) | : Sundar J. Rajan et al. | |

It is certified that error appears in the above-identified patent and that said Letters Patent is hereby corrected as shown below:

Column 9
Line 40, delete "etc," and insert -- etc., --, therefor.

Column 10
Line 43, delete "al." and insert -- al., --, therefor.
Line 45, delete "eds." and insert -- eds., --, therefor.

Column 11
Line 5, delete "eds." and insert -- eds., --, therefor.

Line 5, delete "NY." and insert -- NY, --, therefor.

Line 37, delete "(e.g." and insert -- (e.g., --, therefor.

Column 12
Line 5, delete "Hoboken." and insert -- Hoboken, --, therefor.

Line 16, delete "Inc. Smyrna." and insert -- Inc., Smyrna, --, therefor.

Column 13
Line 36, delete "(e.g." and insert -- (e.g., --, therefor.

Column 15
Line 47, delete "to" and insert -- to, --, therefor.

Column 18
Line 21, delete "Pal," and insert -- Pal. --, therefor.

Line 22, delete "Co." and insert -- Co., --, therefor.

Signed and Sealed this
Twentieth Day of December, 2011

David J. Kappos
*Director of the United States Patent and Trademark Office*

Column 20
Line 9, delete "5." and insert -- 5, --, therefor.

Line 20, delete "Machines." and insert -- Machines, --, therefor.

Column 21
Lines 2 – 7, delete "An adhesion rating of 7, for example.

which would depend on thickness of the coating used, is believed to generally correlate to about 70% of the material remaining, although quantitative image density measurements were not made." and insert -- An adhesion rating of 7, for example, which would depend on thickness of the coating used, is believed to generally correlate to about 70% of the material remaining, although quantitative image density measurements were not made. --, therefor.

Column 22
Line 53, before "Laser" insert -- HP --.